United States Patent [19]
Shaw et al.

[11] Patent Number: 5,845,509
[45] Date of Patent: Dec. 8, 1998

[54] VARIABLE SPEED PARALLEL CENTRIFUGAL COMPRESSORS FOR HVAC AND REFRIGERATION SYSTEMS

[76] Inventors: David N. Shaw, 200 D. Brittany Farms Rd., New Britain, Conn. 06053; Giridhari L. Agrawal, 22 Hampden Circle, Simsbury, Conn. 06070

[21] Appl. No.: 937,984

[22] Filed: Sep. 26, 1997

[51] Int. Cl.⁶ .............................. F25B 7/00; F04B 41/06
[52] U.S. Cl. .......................... 62/175; 62/201; 62/228.4; 417/5
[58] Field of Search .............................. 62/175, 510, 201, 62/228.4; 236/1; 417/5

[56] References Cited

U.S. PATENT DOCUMENTS

| | | | |
|---|---|---|---|
| 5,097,670 | 3/1992 | Yoshikawa et al. | 417/5 X |
| 5,743,714 | 4/1998 | Drob | 417/5 X |
| 5,743,715 | 4/1998 | Staroselsky et al. | |

*Primary Examiner*—William E. Wayner
*Attorney, Agent, or Firm*—Fishman, Dionne, Cantor & Colburn

[57] ABSTRACT

A plurality of variable speed centrifugal compressors operated in parallel form an HVAC or refrigeration system. The compressors are operated at proportionally synchronized speeds throughout their range of operation.

12 Claims, 3 Drawing Sheets

VARIABLE SPEED PARALLEL CENTRIFUGAL COMPRESSORS FOR HVAC AND REFRIGERATION SYSTEMS

BACKGROUND OF THE INVENTION

This invention relates to the subject of HVAC and refrigeration systems. More particularly, this invention relates to HVAC and refrigeration systems employing centrifugal compressors.

Water cooled and air cooled HVAC and refrigeration systems are well known in the art, and prior art systems use positive displacement type (reciprocating, scroll or screw) compressors or non-positive displacement centrifugal compressors. More particularly, prior art water cooled systems are known in which one centrifugal compressor is used for the full range of system load and system head (or lift) conditions. Prior art air cooled systems mostly use positive displacement compressors. These air cooled systems have typically used multiple positive displacement compressors, which do not have the surge problem of centrifugal compressors. This air cooled market is moving to the use of positive displacement scroll and screw compressors for reliability reasons, but, prior to this invention, not to the use of multiple centrifugal compressors operating in parallel in a single system. In some cases air-cooled chiller systems have been built using a single fixed speed centrifugal compressor with inlet guide vane capacity control means; but these systems had surge problems which required the use of extensive and highly inefficient artificial loading under relatively high head/low load conditions in order to avoid surge.

The primary reason that centrifugal compressors have been heretofore eschewed in air cooled systems is the fundamental problem of centrifugal compressor surge encountered in certain operating conditions. An air cooled system is required to operate at and anywhere between the seemingly abnormal extremes of high cooling load and relatively low head and low cooling load and relatively high head. A high cooling load occurs when, e.g., a building space is densely populated or a high heat load is generated by computer or other types of equipment, or a refrigerator volume is heavily loaded with material to be cooled or frozen; and a high head is created when the outdoor ambient temperature is high (thus causing a relatively high condensing pressure/head). Conversely, a low cooling load occurs when the building space is not densely populated, or has a low heat load from other sources, or when a refrigerator volume is only lightly loaded with material to be cooled or frozen. It is in this latter situation, i.e., the situation of low load and high head, that the surge problem would occur if a centrifugal compressor were used in an air cooled system. In water cooled centrifugal systems, it is typical to use a condenser water cooling tower. This tower allows the condenser water temperature to approach the outdoor ambient wet bulb temperature instead of the dry bulb temperature that air cooled systems must encounter. The wet bulb temperature does not reach the high levels that the dry bulb reaches, thus; the surge problem is much less severe. Therefore, centrifugal compressors are widely used in water cooled systems because they are more efficient and reliable than positive displacement compressors have been.

Whereas the head generating capability of a positive displacement compressor does not vary with speed (for all practical purposes), the ability of a given centrifugal compressor to generate head drops very rapidly as the speed drops. This creates a difficult problem when utilizing centrifugal compressors if variable speed is to be the only means of capacity control and low load, relatively high head situations must be dealt with. The present invention deals very effectively with this problem while concurrently assuring that the maximum possible compression efficiency is always maintained regardless of the load on the system.

It is well known in the art that, in a single centrifugal compressor system, if the load is decreased in a relatively high head situation, a reduction in compressor speed to balance the decreased load will quickly result in surge of the compressor if compensating steps are not taken. In the prior art, the surge condition can be (and must be) avoided by artificially loading the system in some manner, for example, by by-passing discharge gas to the low side of the compressor to maintain sufficient impeller flow to generate the required head. However, such compensating steps are very inefficient and costly, since the compressor is made to operate at a much higher than actual load thus consuming excessive power.

It is also to be noted that while prior art water cooled centrifugal systems for commercial and industrial applications need only one cooling circuit because reliability is high, it is typical to use two cooling circuits in parallel for redundancy in prior art commercial/industrial air cooled systems because the equipment reliability is not high.

SUMMARY OF THE INVENTION

In the present invention, an air (or water) cooled system is provided with a plurality of proportionally synchronized variable speed centrifugal compressors operated in parallel. By "proportionally synchronized", we mean that equally sized compressors each operate at the same speed throughout their range of operation, whereas unequally sized compressors different but always proportional speeds throughout their range of operation. The system of this invention has preferably two compressors of unequal capacity, but it could also have three, four or more compressors of the same or different capacities operating in parallel. The presence of the plurality of proportionally synchronized variable speed centrifugal compressors operating in parallel avoids the surge problem, because one or more of the parallel compressors can be shut down when the high head/low load situation is encountered, thus allowing the remaining compressor or compressors to operate at speeds sufficiently high to generate the necessary head without having to artificially load the compressor(s) to avoid surge. If the same low cooling load is again considered but at a much lower ambient temperature, and thus much lower condensing pressure/head, it is desirable to operate at lower speeds in order to optimize compressor efficiency. However, if only one compressor has been operating at a higher speed with an inlet flow leading to a head generating capability much greater than that which is now required by the system, the obtained compressor efficiency will be very low as much unneeded impeller work is wasted. With more compressors operating, higher efficiency will be obtained as lower speeds are commanded which in turn will generate lower head more in harmony with the system conditions. Thus when operating under a low head, light load condition, less system power will be required by having more compressors operating but at lower speeds compared to what is required with the same load but higher head. This almost sounds as if it is a contradiction until one properly relates system load versus head with the absolute capabilities of variable speed centrifugal compressors employed in the system. If a single variable speed centrifugal compressor is considered for an air cooled chiller system, very good performance can be realized as long as the lift requirement drops in approximate proportion to the load on the system. If the lift requirement does not drop this rapidly with load, the single compressor will enter surge at a relatively high percent load condition thus requiring extensive artificial loading to maintain system operation. However, with a system of multiple parallel centrifugal compressors, a system computer can be programmed with algorithms that will cause compressor(s) to be shut down if the lift requirement becomes too great for the system load being encountered. This in turn will cause the remaining compressor(s) to speed up in order to handle the necessary flow. This will automatically generate the higher lift that is necessary in order to remain safely away from surge. Thus, a system is obtained that will always operate at optimum efficiency and will still be capable of operating properly under the light load and high head conditions that occur in the overall operation/application of HVAC and/or refrigeration systems, including those systems employing heat reclaim and/or thermal storage.

In the preferred embodiment of the present invention, the maximum compressor tonnage for the system is divided between two compressors on a 2:1 basis. Thus, for a 120 ton system, one compressor has a capacity of 80 tons and the other compressor has a capacity of 40 tons. When full system capacity is required, the two compressors can be operated simultaneously and at the required speeds for the maximum load/high head situation. The two compressors thus constitute, in effect, a third compressor with the combined capacity of the two compressors. As load and/or head changes, one or the other of the two compressors can be taken off the line (or brought back on the line) to meet the changed circumstances and requirements. An obvious advantage of this 2:1 basis is the ability to very effectively deal with the low load, relatively high head condition often encountered in air conditioning systems. The smaller compressor operating alone allows maximum head capability at only one third of maximum system load.

BRIEF DESCRIPTION OF THE DRAWINGS

Referring now to the drawings.

DESCRIPTION OF THE PREFERRED EMBODIMENT

Figure 1:
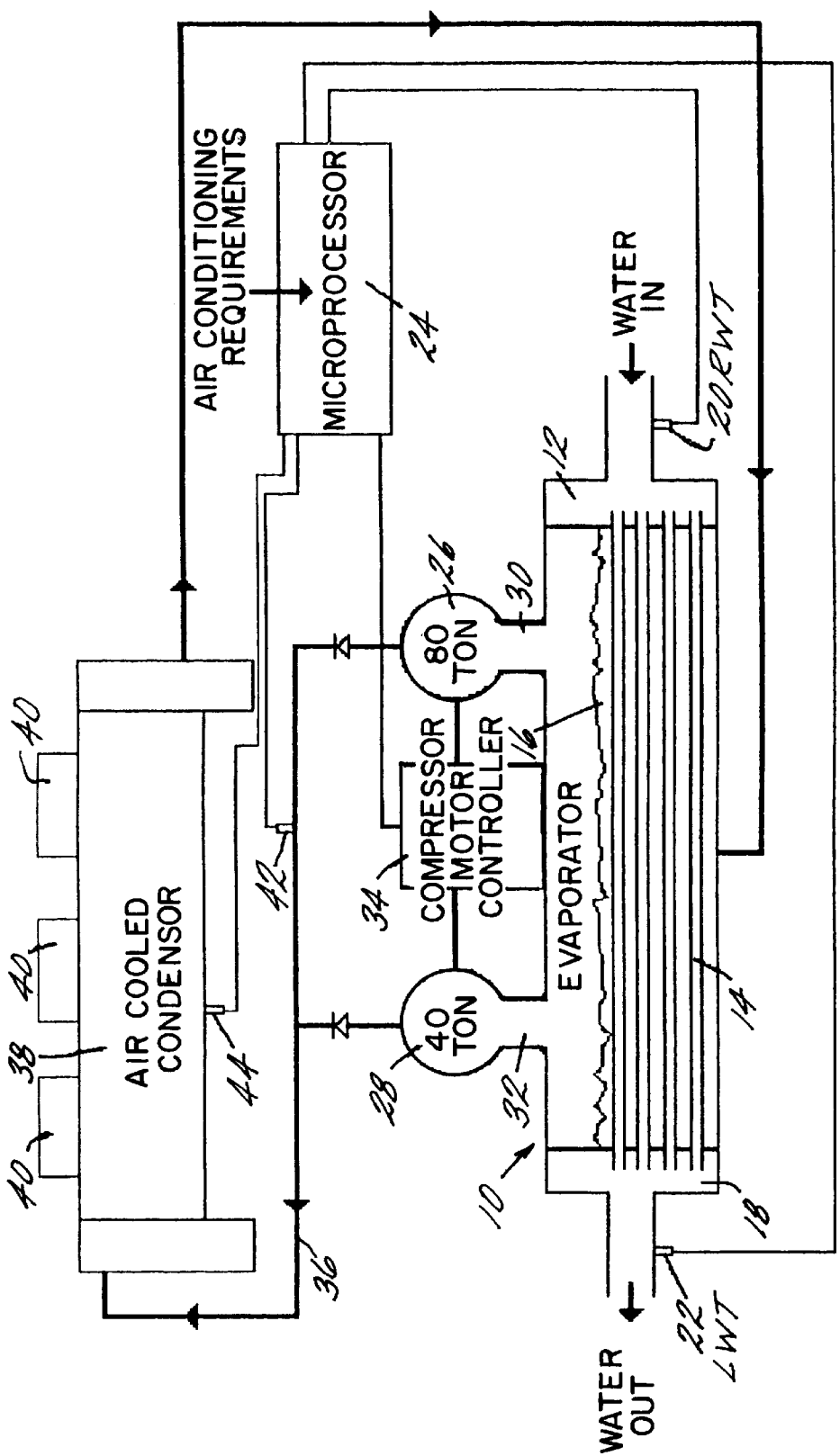
FIG. 1 is a schematic of a HVAC or refrigeration system employing the present invention.

Referring to FIG. 1, a schematic of an HVAC system in accordance with the present invention is shown. The system includes an evaporator 10 of the flooded type. Warm water (water in) is supplied to a header 12 which feeds the water to tubes 14. The tubes 14 are submerged beneath the level of a refrigerant 16. The warm water passing through the tubes 14 vaporizes the refrigerant, thereby cooling the water. The cooled water flows into a header 18 and then flows (water out) to a heat source (not shown) and is warmed before being returned to header 12. A temperature sensor 20 senses the temperature of the warm water being returned to header 12 (the returned water temperature RWT), and a temperature sensor 22 senses the temperature of the cooled water (CWT) exiting from the evaporator. The outputs from temperature sensors 20 and 22, which may be DC voltage signals, are delivered to a microprocessor 24.

A pair of centrifugal compressors 26 and 28 are connected for fluid flow to evaporator 10 via conduits 30 and 32, respectively. Compressors 26 and 28 are proportionally synchronized variable speed compressors, and they are connected to and driven by compressor motor controller 34 which, in turn, is connected to and receives control commands from microprocessor 24. While the capacity of compressors 26 and 28 may be equal, it is preferable that the capacities be different, and particularly preferable that the capacity of one be twice that of the other. Thus, for example, for a 120 ton HVAC system, it is preferable that one centrifugal compressor, e.g., compressor 26, be an 80 ton unit, and the other, i.e., compressor 28, be a 40 ton unit. It is also preferred that the compressors be high speed machines having a maximum speed capability of at least 6,000 RPM.

Depending on whether both, or only one, of the compressors 26, 28 are operating, the evaporated refrigerant flows to the compressor(s), is compressed, and is delivered to conduit 36 and flows to an air cooled condenser 38, which may have a plurality of fans 40 for delivering air to condenser 38. A sensor 42 senses the system condensing pressure (SCP) in line 36 just downstream of the exit(s) from compressor(s) 26 and/or 28, and a sensor 44 scans the condenser entering air temperature (CEA) in condenser 38. The outputs from sensors 40 and 42, which may be DC voltage signals, are delivered to microprocessor 24.

By "proportionally synchronized" variable speed compressors, it is meant that when operated together, the speeds of the compressor will be varied in equal percentage amounts. For example, a 10% change in the speed of one compressor will be matched by a 10% change in the speed of the other. For example, if the 80 ton compressor 26 has a maximum load speed of 30,000 RPM and the 40 ton compressor 28 has a maximum load speed of 40,000 RPM, a 10% speed reduction would result in compressor 26 operating at 27,000 RPM and compressor 28 operating at 36,000 RPM. If the compressors operate at the same speeds, then proportional changes will result in equal changes at all times. Of course, the capacities and speeds recited above are merely by way of example.

In addition to the signals from sensors 20 (RWT), 22 (CWT), 42 (SCP) and 44 (CEA), microprocessor 24 also receives inputs indicating refrigeration or air conditioning requirements, as indicated in FIG. 1. The microprocessor control system is substantially the same as disclosed in U.S. Pat. No. 5,295,362, the entire contents of which are incorporated hereby by reference.

Proper control of CWT is the primary function of evaporator 10. An increasing chilled water temperature (CWT) means that the evaporator capacity is not high enough to sufficiently cool water returning from the system. With increasing load on the system, the return water temperature (RWT) will start to rise, and this will cause the system to respond by increasing the capacity of evaporator 10 to avoid a significant change in CWT.

Still referring to FIG. 1, the outputs from microprocessor 24 to compressor motor controller 34 are signals (e.g., DC voltage signals) which are, by design, essentially proportional to the actual evaporator capacity being generated. Maximum voltage (commensurate with a high system load and a high head condition) will call for both compressors 26 and 28 to operate at their respective maximum speeds (which may be equal or different), and the unit will operate at maximum capacity. If the load on the system begins to fall, the chilled water temperature (CWT) at sensor 28 will begin to fall. When the CWT falls below a programmed point, microprocessor 24 will deliver a signal to compressor motor controller 34 to cause both compressors 26 and 28 to reduce their speeds proportionally. Both compressors 26 and 28 will remain operational and at proportionally reduced speeds, even at relatively low total loads on evaporator 10, as long as the inputs to microprocessor 24 from system condensing pressure (SCP) sensor 42 and condenser entering air temperatures (CEA) sensor 44 are commensurate with condensing conditions consistent with efficient and surge-free operation of the compressors.

If the condensing conditions at the reduced load are not consistent with surge-free operation of the compressors (the symptoms of which will be high CEA temperature sensed at sensor 44 and a high SCP pressure sensed at sensor 42), the smaller compressor, i.e., compressor 28, will be taken off the line by termination of operation of compressor 28 by compressor motor controller 34 under command from microprocessor 24. Microprocessor 24 will simultaneously deliver a command to controller 34 to increase the speed of the remaining larger compressor 26 to handle the flow that was being taken by the other compressor that is now off line. This higher speed of compressor 26 also generates higher head, thus eliminating the surge concern that was the causal factor for the mode shift from two operating compressors to the operation of only the larger of the two compressors.

If the load continues to fall with the head remaining relatively high (i.e., a high CEA temperature sensed at sensor 44), and a point is again reached where the system condensing pressure (SCP), as sensed at sensor 42, is too high for the single larger compressor 26 to easily stay out of surge range, then microprocessor 24 will issue a command to compressor motor controller 34 to resume operation of smaller compressor 28, whereby smaller compressor 28 will be again brought on line. Once the speed (RPM) of compressor 28 reaches its proper proportional relationship to the speed of compressor 26, the larger compressor 26 will be taken off line immediately by a command from microprocessor 24 to motor controller 34 to terminate operation of larger compressor 26; and microprocessor 24 will then issue a command to motor controller 34 to further increase the speed of smaller compressor 28 to handle the total necessary evaporator vapor flow requirements. Once again, since the speed of compressor 28 is now high, the compressor is safely away from surge.

While the foregoing has described system mode changes going from a first mode of operation of both compressors at maximum requirements of high load and high head to a second mode of operation with termination of operation of one compressor (in the preferred embodiment the smaller compressor) with one remaining operative (the larger in the preferred embodiment), as load declines with relatively high head, to a third mode of operation with resumption of operation of the smaller compressor and termination of the operation of the larger compressor as load further declines with relatively high head, it will be understood that the reverse would occur in regard to termination and operation of the compressors as load goes from a low level to a high level with a relatively high head. That is to say, if the system were operating in the mode of low load and relatively high head, with only smaller compressor 28 being on line, and if the load progressed from a low load to a high load, the changes in mode of operation would be the reverse of that described above in going from the high load/high head situation to the low load/relatively high head situation.

With the preferred embodiment of the smaller compressor being half the capacity of the larger compressor, maximum head capability exists at one third of the total chiller capacity. This is very desirable, since HVAC and/or refrigeration systems are often called upon to operate at conditions of relatively low load and relatively high head.

Once a major change in operating mode (i.e., a compressor turned on or off) has been put into effect by commands from microprocessor 24, at a particular load and head, another change will not be commanded due to load change alone unless there is either a further significant reduction or increase in load (which cannot be handled by speed change alone). Such changes will of course occur, but, the predetermined change in load required to cause a mode change will be great enough that a significant time span will normally occur between mode changes. This significant time span is consistent with the desirability of minimum on-off cycling of the compressors. It is also to be noted that the system does not require mechanically variable inlet guide vanes for flow control to the compressors. Flow control is effected by control of compressor speed only.

If a basic mode change has been brought about due to surge conditions being approached, the higher speed fewer compressor mode will prevail for a significant predetermined period of time even if the condensing condition quickly becomes consistent with a mode allowing lower speed of operation of both (or more) compressors. This again is consistent with minimum on-off cycles of the compressors.

The combination of two unequal size variable speed parallel centrifugal compressors is very consistent with both on-off cycle free operation and high system efficiency at all load conditions as well as also offering low load/high head capability.

The chiller microprocessor will be programmed with all the necessary algorithms to properly control all mode shifting as well as speed control. The microprocessor will always know the following: system load, condensing pressure, compressor speed, compressors on-line, etc. It is easy to understand that once these things are known, the programmed algorithms will cause all mode shifting to occur at the proper points. Programming of the microprocessor 24 to accomplish these control objectives is well within the skill of programmers of ordinary skill in the art of programming.

Although the preferred configuration has been disclosed with two compressors, with one being one half the size of the other, it will be understood that compressor size ratios of other than 2:1 may be used and that more than two compressors operating in parallel may be used. For example, two compressors of equal size can be used (e.g., two 60 ton compressors for a 120 ton system), or three compressors of equal size (e.g., three of 60 ton capacity for a 180 ton system) may be used, or four compressors of equal size (e.g., four of 60 ton capacity for a 240 ton system) may be used, etc., with one or more being taken off line or brought on line as circumstances require. Also, while it is preferred that the compressor sizes be in a ratio of 2:1 for the two compressor system, the sizes can range anywhere from equal, i.e., 1:1 to anywhere between 1:1 and 2:1, and may also in other ratios, such as 3:1, 4:1, 5:1, etc. The essential feature is that the system employ multiple (two or more) variable speed centrifugal compressors in parallel, regardless of the size ratios between the various compressors.

The more compressors used in a system, the better the efficiency and degree of control that can be obtained. However, the cost of the system increases as more compressors are used. Therefore, from a cost standpoint it is preferred to use only two compressors. Also, it appears, but it is not certain, that a 2:1 compressor size ratio, as discussed above, achieves maximum efficiency for the fewest compressors in a multicompressor system; but we do not want to be bound to or limited in that belief or configuration. It is to be noted that a 2:1 system operates the same as a system of three compressors of equal size. For example, in a 2:1 system of 120 tons total capacity, the 40 ton compressor is the same as a 40 ton compressor in a three compressor system; and the 80 ton compressor is the equivalent of two 40 ton compressors; and 80 ton and 40 ton compressors are the equivalent of the three 40 ton compressors.

Figure 2:
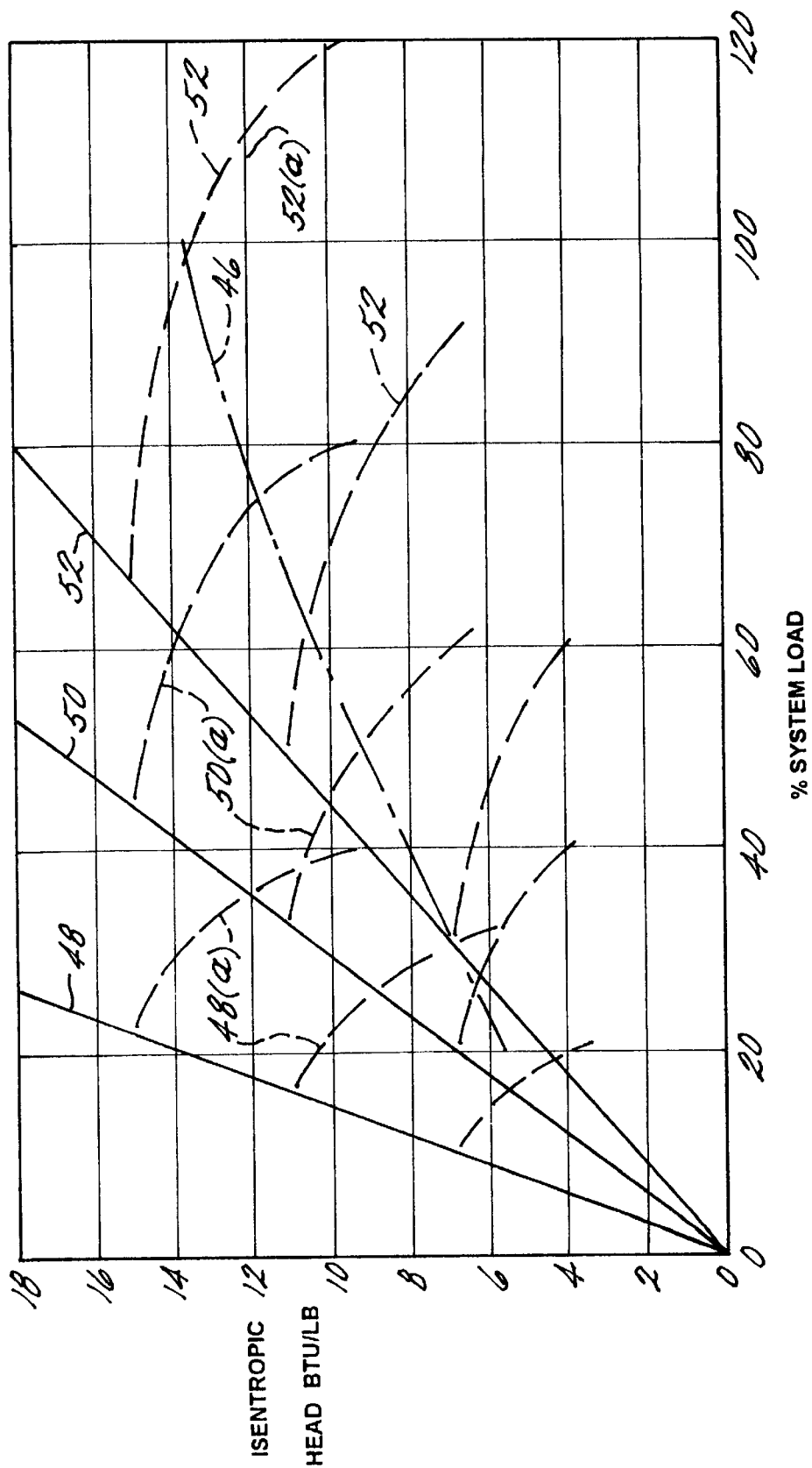
FIG. 2 is a graph of system load vs. head for a multiple (2) centrifugal compressor system wherein the capacity of one compressor is twice that of the other.

Referring now to FIG. 2, a graph is shown of system load (%) vs. isentropic head (BTU/#) for the system of FIG. 1, i.e., for a two compressor system having a 2:1 tonnage ratio between the compressors. Line 46 on the graph of FIG. 2 is a somewhat arbitrary typical operating line established by the Air Conditioning and Refrigeration Institute (ARI) in order for the industry to compare competitive systems. Graph lines 48, 50, and 52 are compressor surge lines. Line 48 is the surge line for the smaller compressor 28 operated alone, in a 2:1 system; line 50 is the surge line for the larger compressor 26 operated alone in a 2:1 system; and line 52 is the surge line for combined operation of both the smaller compressor 28 and the larger compressor 26 in the 2:1 system. Lines 48(a), 50(a) and 52(a) emanating; respectively, from lines 48, 50, and 52 are lines of constant speed for compressors 28 alone, 26 alone, and 26 and 28 operated together, but at their proportional speeds. Speed increases from the bottom to the top of the graph. For purposes of efficiency, it is preferable to operate around the mid-point of any particular line of constant speed. It is to be noted that surge line 52 is the same as would be obtained for a single compressor having the combined capacities of the smaller compressor 28 and the larger compressor 26. Thus, this system has, in effect, three compressors, one being smaller compressor 28 (e.g., 40 tons), a second being larger compressor 26 (e.g., 80 tons) and the "third" being the combined equivalent of compressors 26 and 28 (e.g., 120 tons).

Each compressor operated singly and the pair operated together must operate to the right of its or their respective surge line. Thus, reflecting what has been said above, it can be seen graphically from FIG. 2 that for a system with only a single compressor (equivalent to the "third" 120 ton compressor of the example), the operating range between the ARI line 46 and the surge line 52 narrows quickly, and the compressor approaches surge for situations of high head and low or decreasing load. By way of significant contrast, by incorporating multiple compressors in accordance with this invention, and especially in the 2:1 size ratio, it can be seen from FIG. 2 that the surge line 50 for compressor 26 (the larger compressor of the pair), is to the left of the surge line 52 for the combined pair of compressors, and, further, that the surge line 48 for compressor 28 (the smaller of the pair) is still further to the left of lines 50 and 52. Thus, as load decreases with high head, the available surge-free operating range and system efficiency increases by switching first to operation only of the larger compressor 26 (e.g., the 80 ton unit), and then switching to only the operation of the smaller compressor 28 (e.g., the 40 ton unit). This variable speed system not only eliminates cycling to balance load but especially facilitates operation in the light load, high head situation.

Figure 3:
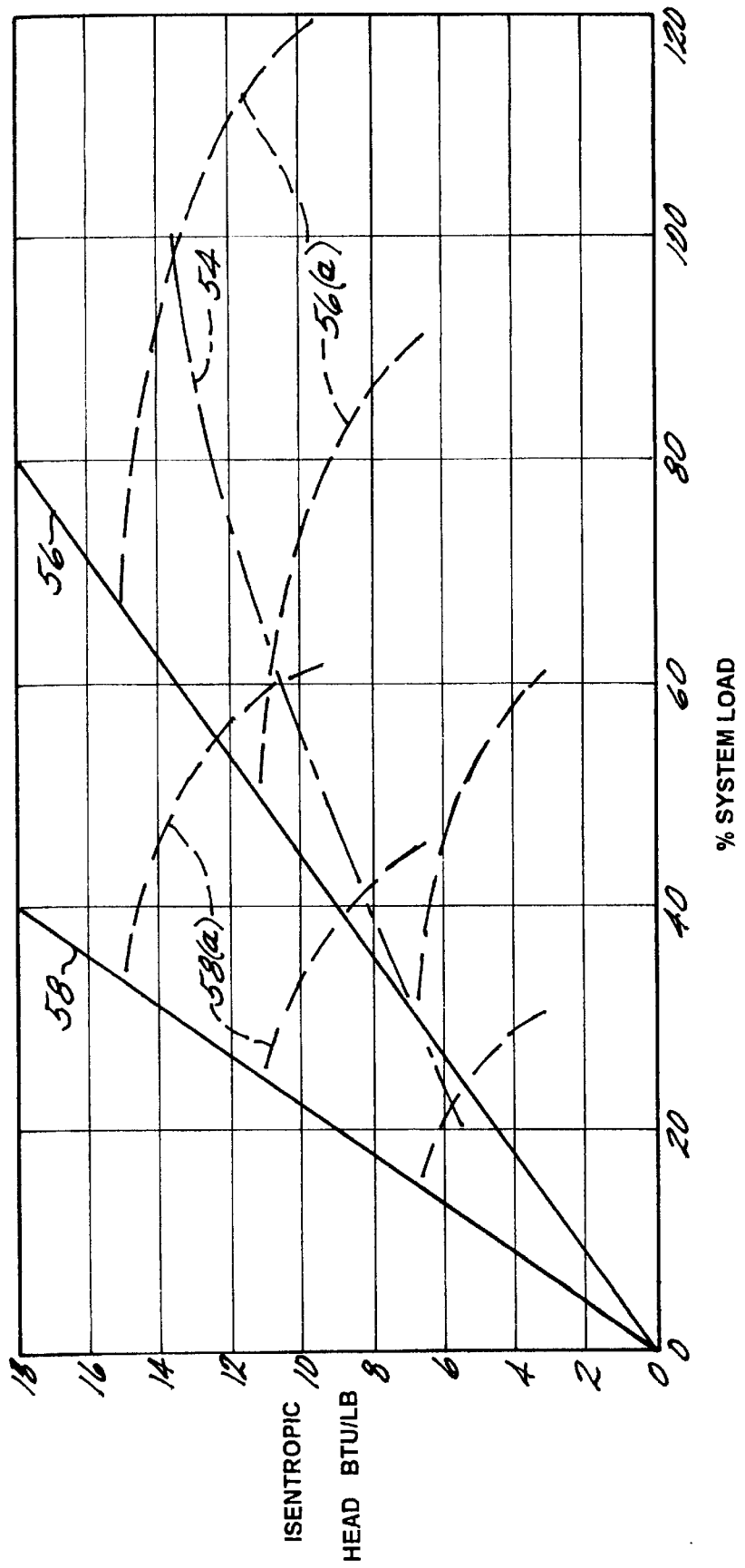
FIG. 3 is a graph of system load vs. head for a multiple (2) centrifugal compressor system wherein the capacities of the compressors are equal.

FIG. 3 is a graph similar to FIG. 2, but for a system in which two compressors of equal size (i.e., a 1:1 ratio) are employed. Thus, for example, for a 120 ton total capacity system, each compressor would be 60 tons. In FIG. 3, line 54 is the ARI line, line 56 is the surge line for the combined parallel operation of the two 60 ton compressors; line 58 is the surge line for one of the 60 ton compressors operated alone; and lines 56(a) and 58(a) are lines of constant speed for the two compressors operated together and one operated alone. As can be seen from a comparison of FIGS. 2 and 3, the two compressors in a 1:1 ratio achieve the basic benefits of this invention through the use of multiple compressors in parallel. Thus, for example, for the low load, high head situation, the stall line 58 for one compressor is to the left of the stall line 56 for combined operation of the two compressors, thus affording a broader efficient and surge-free range of operation. It will be noted that for the 2:1 system depicted in FIG. 2, stall line 48 (for operation of the smaller compressor) is farther to the left than stall line 58 in FIG. 3, which means that the 2:1 system affords a more efficient and broader surge-free range of operation.

While the foregoing discussion has described two similar systems each with two compressors in parallel (one system having a 2:1 size ratio for the compressors and the other having a 1:1 size ratio), it will be understood that three or more compressors can be used in parallel. Thus, for example, the 80 ton compressor in the 2:1 system could be replaced by two 40 ton units in parallel, and the 40 ton unit could be replaced by two 20 ton units in parallel. Similarly, each of the two 60 ton units of the 1:1 system could be replaced by two 30 ton units in parallel or by three 20 ton units in parallel. The more units employed, the better will be the system control and efficiency; but the cost will increase. Thus, from a cost/benefit standpoint, the best system is the one that combines multiple compressors, but as few as possible to achieve a reasonably efficient operation with a good range of surge-free operation.

Additionally, whereas the system shown in FIG. 1 shows only one cooling circuit (e.g., the system shows a single refrigerant circuit with two compressors in parallel in that single circuit), it is to be understood that two (or more) separate cooling circuits could be employed in parallel if (for whatever reason) that practice continues to be an industry desire. The downside of a two (or more) cooling circuit system is that whenever one circuit is shut down, the heat exchange surface of that circuit is no longer active, thus the system head (for the particular load) is higher than it would have been had the total system heat exchange surface remained active as it does in the preferred embodiment of FIG. 1. Higher head requires more power to handle a given load, thus, the overall system suffers. However, the general operation of a system with parallel refrigerant circuits will continue to be as described herein, lower efficiency notwithstanding.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An HVAC or refrigeration system, including:
   at least two centrifugal compressors operable in parallel;
   speed control means for operating said compressors at proportionally synchronized speeds;
   evaporator means connected to supply evaporated refrigerant to said compressors, said evaporator means having said refrigerant in heat exchange communication with an evaporator fluid flowing through said evaporator;

first sensor means for sensing the temperature of said evaporator fluid flowing to said evaporator and for generating a first signal commensurate with said temperature;

second sensor means for sensing the temperature of said evaporator fluid flow from said evaporator means and for generating a second signal commensurate with said temperature;

condenser means supplied with a fluid to be in heat exchange communication with compressed refrigerant fluid;

flow conduit means for delivering compressed refrigerant fluid from said compressors to said condenser means;

third sensor means for sensing system condensing pressure in said conduit means and for generating a third signal commensurate with said pressure;

fourth sensing means for sensing the temperature of heat exchange fluid entering said condenser end for generating a fourth signal commensurate with said temperature;

system controller means, said system controller means being connected to receive said first, second, third and fourth signals, and air conditioning or refrigeration requirements;

said system controller means being connected to said speed control means to operate said centrifugal compressors in parallel at proportionally synchronized speeds in response to changes in said second signal; and said system controller means being effective to selectively discontinue operation of one of said compressors while operating the other of said compressors at a speed sufficient to prevent surge of said other compressor in response to changes in said third and fourth signals.

2. The HVAC or refrigeration system of claim 1 wherein:

said system controller means is also effective in response to changes in said third and fourth signals to resume operation of said one compressor, increase the speed of said one compressor to a proportionally synchronized speed with said other compressor, and discontinue the operation of said other compressor, and increase the speed of said one compressor to avoid a surge condition.

3. The HVAC or refrigeration system of claim 1 wherein:

said system has first and second compressors, and the capacity of said first compressor is twice the capacity of said second compressor.

4. The HVAC or refrigeration system of claim 1 wherein:

said condenser is an air cooled condenser.

5. The HVAC or refrigeration system of claim 4 wherein:

said evaporator is a flooded water evaporator.

6. The HVAC or refrigeration system of claim 5 wherein:

said first signal is commensurate with the returned water temperature entering said evaporator;

said second signal is commensurate with the cooled water exiting from said evaporator; and said fourth signal is the entering air temperature to said condenser.

7. An HVAC or refrigeration system, including:

at least two centrifugal compressors operable in parallel;

a speed controller operating said compressors at proportionally synchronized speeds;

an evaporator connected to supply evaporated refrigerant to said compressors, said evaporator having said refrigerant in heat exchange communication with an evaporator fluid flowing through said evaporator;

a first sensor for sensing the temperature of said evaporator fluid flowing to said evaporator and for generating a first signal commensurate with said temperature;

a second sensor for sensing the temperature of said evaporator fluid flow from said evaporator and for generating a second signal commensurate with said temperature;

a condenser supplied with a fluid to be in heat exchange communication with compressed refrigerant fluid;

a flow conduit for delivering compressed refrigerant fluid from said compressors to said condenser means;

a third sensor for sensing system condensing pressure in said conduit means and for generating a third signal commensurate with said pressure;

a fourth sensor for sensing the temperature of heat exchange fluid entering said condenser end for generating a fourth signal commensurate with said temperature;

a system controller connected to receive said first, second, third and fourth signals, and air conditioning or refrigeration requirements;

said system controller being connected to said speed controller to operate said centrifugal compressors in parallel at proportionally synchronized speeds in response to changes in said second signal; and said system controller being effective to selectively discontinue operation of one of said compressors while operating the other of said compressors at a speed sufficient to prevent surge of said other compressor in response to changes in said third and fourth signals.

8. The HVAC or refrigeration system of claim 7 wherein:

said system controller is also effective in response to changes in said third and fourth signals to resume operation of said one compressor, increase the speed of said one compressor to a proportionally synchronized speed with said other compressor, and discontinue the operation of said other compressor, and increase the speed of said one compressor to avoid a surge condition.

9. The HVAC or refrigeration system of claim 7 wherein:

said system has first and second compressors, and the capacity of said first compressor is twice the capacity of said second compressor.

10. The HVAC or refrigeration system of claim 7 wherein:

said condenser is an air cooled condenser.

11. The HVAC or refrigeration system of claim 10 wherein:

said evaporator is a flooded water evaporator.

12. The HVAC or refrigeration system of claim 11 wherein:

said first signal is commensurate with the returned water temperature entering said evaporator;

said second signal is commensurate with the cooled water exiting from said evaporator; and said fourth signal is the entering air temperature to said condenser.

* * * * *